(12) United States Patent
Funakoshi et al.

(10) Patent No.: US 6,223,000 B1
(45) Date of Patent: Apr. 24, 2001

(54) CAMERA

(75) Inventors: Yasuo Funakoshi, Hachioji; Moriya Katagiri, Tokyo, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/293,414

(22) Filed: Apr. 16, 1999

(30) Foreign Application Priority Data

Apr. 17, 1998 (JP) .................................................. 10-108145

(51) Int. Cl.$^7$ ...................................................... G03B 17/00

(52) U.S. Cl. ............................ 396/299; 396/535; 396/543

(58) Field of Search ............................. 396/85, 299, 535, 396/543, 502

(56) References Cited

U.S. PATENT DOCUMENTS

| | | | |
|---|---|---|---|
| 5,758,214 | * | 5/1998 | Saito et al. ........................... 396/299 |
| 5,956,533 | * | 9/1999 | Endo et al. ............................ 396/85 |
| 6,052,538 | * | 4/2000 | Goto et al. ........................... 396/299 |

FOREIGN PATENT DOCUMENTS

| | | |
|---|---|---|
| 1-302234 | 12/1989 | (JP) . |
| 9-133955 | 5/1997 | (JP) . |

\* cited by examiner

*Primary Examiner*—David M. Gray
(74) *Attorney, Agent, or Firm*—Ostrolenk, Faber, Gerb & Soffen, LLP

(57) ABSTRACT

In a camera, a shutter release button is arranged on one surface on the top side of the external housing of the camera and a zoom operating button is arranged on a second surface, which is formed as a step relative to the first surface.

14 Claims, 2 Drawing Sheets

CAMERA

BACKGROUND OF THE INVENTION

1. Field of the Invention

The present invention relates to cameras, and, more particularly, to a camera having a plurality of operating members such as a release button and zoom button.

2. Description of the Related Art

Conventionally, a release button, which is an imaging operating member in a camera, is typically arranged on the top surface of the camera body. Cameras of a type having a zoom lens in an imaging optical system, have on the top surface of the camera body, an operating button, specifically a zoom button, for turning on and off a switch that drives the zoom lens to change the focal length of an imaging lens.

Japanese Unexamined Patent Publication No. 9-133955 discloses a camera in which a release button and a zoom button are juxtaposed on the top surface of the camera body. Japanese Unexamined Patent Publication No. 1-302234 discloses a camera in which a release button and normally covered operating members are arranged on the top surface of the camera body.

In the camera of this type in which the release button and the zoom button are mounted on the same top surface of the camera body, both buttons are typically designed to be operated by the same finger of one hand. In such a camera, the zoom button is mounted in close proximity to the release button, for example, next to the release button.

A user who is not used to the picture-taking operation of the camera may erroneously press the zoom button instead of the release button or the release button instead of the zoom button while viewing through a view finder to observe the subject being photographed. The user may thus perform an unintended picture taking, fail to perform a quick shutter releasing, or fail to perform a smooth zooming operation. Further, when the camera has an auto-focus feature, the release button is typically operated with a two-step process which includes a first pressing step for photometering lay to focusing and a second pressing step for shutter releasing. As far as the above-identified disadvantages are concerned, the automatic focus feature thus presents an additional difficulty in a picture taking operation.

SUMMARY OF THE INVENTION

It is a first object of the present invention to prevent operating members arranged in proximity to each other on a camera from being erroneously operated.

It is a second object of the present invention to provide a camera that frees a user from erroneously operating a zoom button instead of a release button or the release button instead of the zoom button.

The camera of the present invention includes a first surface at one face of the external housing of the camera, a second surface, formed as a step relative to the first surface, a first operating member arranged on the first surface, and a second operating member arranged on the second surface.

These objects and advantages of the present invention will become further apparent from the following detailed explanation.

DESCRIPTION OF THE PREFERRED EMBODIMENTS

Figure 1:
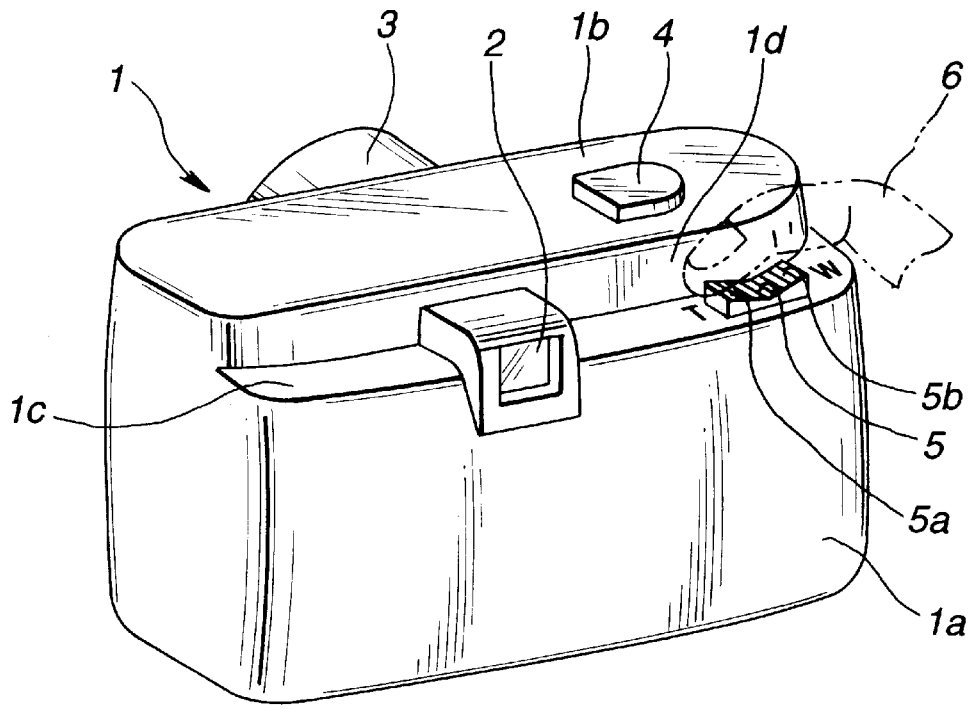
FIG. 1 is an external perspective view of a camera of a first embodiment of the present invention, as viewed from above and behind the camera.

Referring now to the drawings, the embodiments of the present invention are now discussed.

FIG. 1 is an external perspective view of a camera of a first embodiment of the present invention, as viewed from above and behind the camera. Referring to FIG. 1, a step is formed where a rear surface 1a and a top surface 1b meet, and has an upper surface 1c different from the top surface 1b of the camera body.

A view finder 2 is arranged on the central upper portion of the rear surface 1a of the camera body 1 and straddling the upper surface 1c and the rear surface 1a. An imaging lens barrel 3 having a zoom lens is arranged in the center of the front side of the camera body 1.

A release button 4, as a first operating button, is arranged on the right-hand side of the top surface 1b (first surface), one of the external faces of the camera body 1. The release button 4 controls the opening of a lens shutter in the imaging lens or a focal-plane shutter placed in front of a film plane. The release button 4 may be a two-step button switch which performs photometering and range finding at a first pressing step, and performs a shutter release operation at a second pressing step.

A zoom button 5, as a second operating button/switch is arranged on the right-hand side of the step surface 1c (second surface), which is different from the top surface 1b of the camera body 1 having the release button 4 thereon. Furthermore, the zoom button 5 is arranged closer to one side (right side as shown in FIG. 1) and closer to the rear surface 1a than the release button 4.

The zoom button 5 changes the focal length of the imaging lens, and is a seesaw-type (rocker) button switch having two pressing ramp portions 5a and 5b with faces upwardly inclined from the center upwards towards toward each side of the button 5. When the pressing portion 5a of the seesaw-type zoom button 5 is pressed downward, the imaging lens shifts its focal length to the telephoto position. When the pressing portion 5b of the seesaw-type zoom button 5 is pressed downward, the imaging lens shifts its focal length to the wide-angle position.

In the camera 1 of the first embodiment of the present invention, a photographer presses either one pressing portion 5a or the other pressing portion 5b of the zoom button 5 for zooming while observing a subject through the view finder 2. Referring to FIG. 1, the tip of a finger 6 (as represented by the broken line) of the photographer is restrained by a wall 1d that extends upwardly from the step surface 1c to the top surface 1b having the release button 4 thereon. The release button 4 on the upper surface 1c is now out of reach of the finger 6 when positioned over the release button 4.

The photographer then presses the release button 4 with the finger 6 for a shutter release. The presence of the step keeps the zoom button 5 out of reach of the finger 6 when positioned over the zoom button 5. The photographer will thus be unlikely to erroneously press the wrong button even when the photographer takes picture while looking into the view finder.

Figure 2:
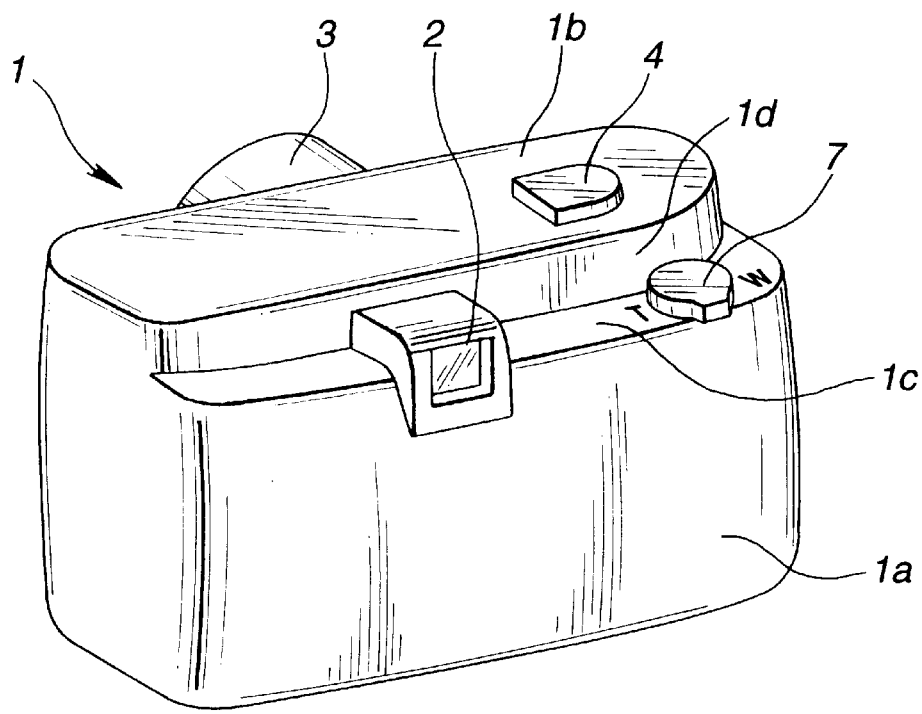
FIG. 2 is an external perspective view of a camera of a second embodiment of the present invention, as viewed from above and behind the camera.

FIG. 2 is an external perspective view of a camera of a second embodiment of the present invention, as viewed from above and behind the camera. The camera of the second embodiment is different from that of the first embodiment in that a zoom button 7, as the second operating button/switch, is a rotary dial button. Components identical to those described in connection with the first embodiment are designated with the same reference numerals and the discussion about them is not repeated here. Also, like reference numerals are used to designate identical components shown in FIG. 3 for a third embodiment and shown in FIG. 4 for a fourth embodiment.

The zoom button 7, as the second operating button switch, is arranged on the right-hand side of the step surface 1c, which is different from the top surface 1b of the camera body 1 having the release button 4 thereon. The zoom button 7 is rotatable about an axis of rotation perpendicular to the step surface 1c. The zoom button 7 is arranged closer to one side (right side as shown in FIG. 2) and closer to the rear surface 1a than the release button 4.

The photographer turns the zoom button 7 for effecting the zooming operation while viewing the subject to be photographed through is the view finder 2. Turning the zoom button 7 counterclockwise shifts the focal length of the imaging lens to the telephoto position while turning the zoom button 7 clockwise shifts the focal length of the imaging lens to the wide-angle position.

When the thumb of the photographer turns the zoom button 7 in the camera of the second embodiment, the wall ld restrains the thumb from touching the release button 4 on the top surface 1b.

The photographer then presses the release button 4 for the shutter release. When the photographer uses his or her index finger to press the release button 4, the zoom button 7 is out of reach of the index finger. The photographer is thus unlikely to erroneously press a wrong button even when the photographer takes the picture while looking into the view finder.

Figure 3:
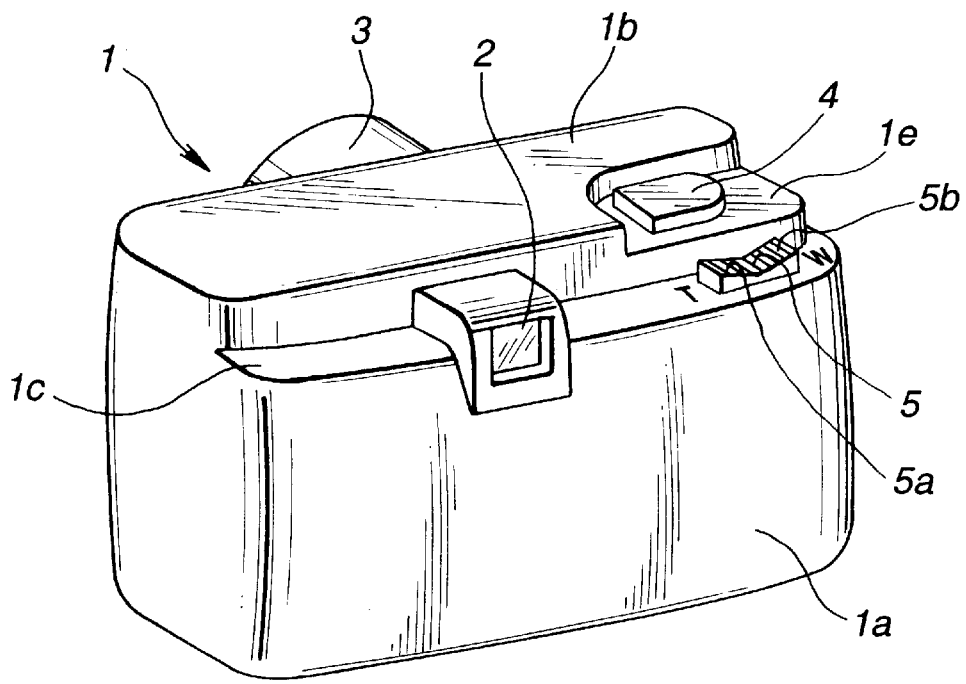
FIG. 3 is an external perspective view of a camera of a third embodiment of the present invention, as viewed from above and behind the camera.

FIG. 3 is an external perspective view of a camera of the third embodiment of the present invention, as viewed from above and behind the camera. The camera of the third embodiment is different from the camera of the first embodiment in that the release button 4 is arranged on a second step that is formed by partly cutting away the top surface 1b, that is, on a surface 1e of a cutout portion that forms a middle level between the top surface 1b and the step surface 1c.

The second step surface 1e is formed at a level higher than the first step surface 1c by cutting away the right-hand side, rear portion of the top surface 1b.

Figure 4:
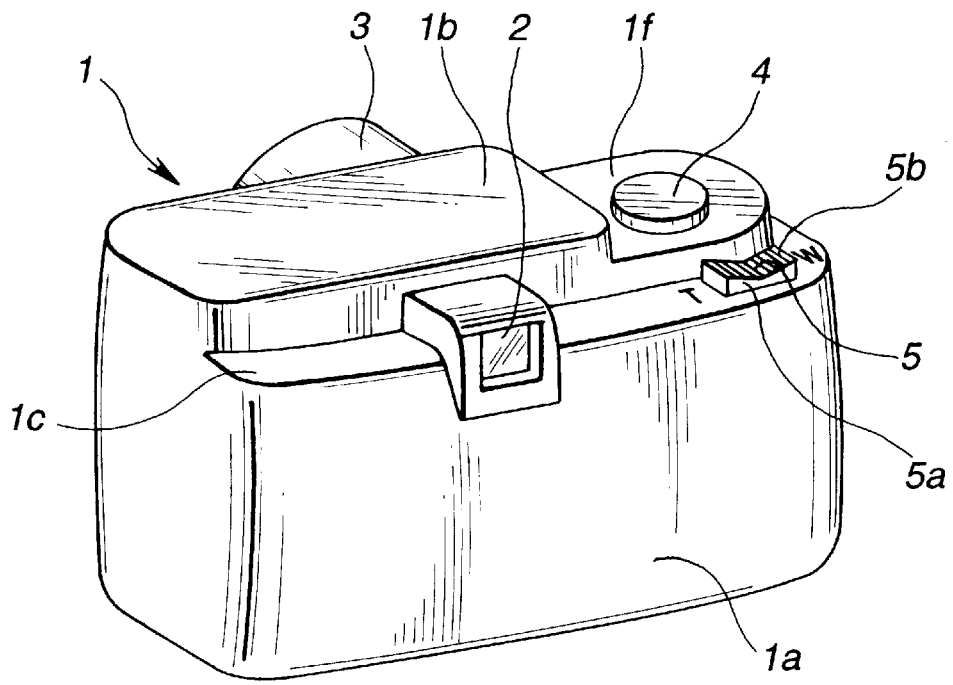
FIG. 4 is an external perspective view of a camera of a fourth embodiment of the present invention, as viewed from above and behind the camera.

FIG. 4 is an external perspective view of a camera of the fourth embodiment of the present invention, as viewed from above and behind the camera. The camera of the fourth embodiment is different from the camera of the first embodiment in that the release button 4 is arranged on a second step that is formed by partly cutting away the top surface 1b, that is, on a surface 1f of a cutout portion that forms a middle level between the top surface 1b and the step surface 1c.

The second step surface 1f is formed at a level higher than the first step surface 1c by cutting away the right-hand side of the top surface 1b.

In the third and fourth embodiments of the camera, the release button 4 is arranged on the step surfaces 1e and 1f, respectively, slightly lower than the level of the top side of the camera body 1, and the zoom buttons 5 and 7 are respectively arranged on the step surface 1c at a level lower than the step surfaces 1e and 1f having the release button 4 thereon.

In the present invention, it is not a requirement that the release button 4 is arranged on the topmost surface of the camera body 1.

Button switches as arranged in the present invention may be any buttons or switches known to be provided in a camera.

In this invention, it is apparent that a wide range of different working modes can be formed on this basis of this disclosure without departing from the spirit and scope of the invention. This invention is not restricted by any specific embodiment disclosed herein except as limited by the appended claims.

What is claimed is:

1. A camera comprising:
    a housing including a rear face having a view finder disposed thereon, a lower top surface intersecting the rear face, an upper top surface substantially parallel and spaced above the lower top surface, the upper top surface being spaced away from the rear face, and a common wall intersecting the lower top surface and the upper top surface; and
    two control buttons each disposed on a respective one of the lower top surface and the upper top surface.

2. A camera according to claim 1, wherein the two control buttons are a zoom switch and a shutter release button.

3. A camera according to claim 2, wherein the zoom switch is a rocker type switch.

4. A camera according to claim 3, wherein the shutter release button causes an automatic focus operation when it is partially depressed and a shutter release operation when it is fully depressed.

5. A camera according to claim 4, wherein the shutter release button extends from the upper top surface and the zoom switch extends from the lower top surface.

6. A camera according to claim 2, wherein the shutter release button extends from the lower top surface and the zoom switch extends from the upper top surface.

7. A camera according to claim 2, wherein the zoom switch and the shutter release button are disposed near one another.

8. A camera comprising:
    a housing including a rear face having a view finder disposed thereon, a first top face intersecting the rear face, a second top face and a third top face each substantially parallel and spaced above the first top face and spaced away from the rear face, the third top face being spaced above the second top face, a common wall intersecting the first, second and third top faces and an auxiliary wall intersecting the second and third top faces; and
    two control buttons each disposed on a respective one of the first top face and the second top face.

9. A camera according to claim 8, wherein the two control buttons are a zoom switch and a shutter release button.

10. A camera according to claim 9, wherein the zoom switch is a rocker type switch.

11. A camera according to claim 10, wherein the shutter release button causes an automatic focus operation when it is partially depressed and a shutter release operation when it is fully depressed.

12. A camera according to claim 11, wherein the shutter release button extends from the first top face and the zoom switch extends from the second top surface.

13. A camera according to claim 9, wherein the shutter release button extends from the second top face and the zoom switch extends from the first top face.

14. A camera according to claim 9, wherein the zoom switch and the shutter release button are disposed near one another.

* * * * *